United States Patent [19]

Fujita et al.

[11] Patent Number: 4,632,413
[45] Date of Patent: Dec. 30, 1986

[54] BODY BANKING SUSPENSION APPARATUS FOR A VEHICLE

[75] Inventors: Haruyasu Fujita, Tokyo; Kenji Honma; Masao Ogawa, both of Shiki, all of Japan

[73] Assignee: Honda Giken Kogyo Kabushiki Kaisha, Tokyo, Japan

[21] Appl. No.: 702,210

[22] Filed: Feb. 15, 1985

[30] Foreign Application Priority Data

| Feb. 22, 1984 | [JP] | Japan | 59-30382 |
| Feb. 24, 1984 | [JP] | Japan | 59-33970 |
| Feb. 24, 1984 | [JP] | Japan | 59-33971 |
| Feb. 25, 1984 | [JP] | Japan | 59-33336 |

[51] Int. Cl.⁴ .............................................. B60G 21/00
[52] U.S. Cl. ................................. 280/112 A; 280/772
[58] Field of Search ........................ 280/772, 112 A; 180/210

[56] References Cited

U.S. PATENT DOCUMENTS

| 2,852,268 | 9/1958 | Johnson | 280/112 A |
| 4,360,224 | 11/1982 | Sato | 280/772 |
| 4,546,997 | 10/1985 | Smyers | 280/772 |

Primary Examiner—John J. Love
Assistant Examiner—Karin L. Ferriter
Attorney, Agent, or Firm—Armstrong, Nikaido, Marmelstein & Kubovcik

[57] ABSTRACT

A suspension apparatus for a vehicle adapted to decline the body and/or the wheels toward the turning center side according to the steering operation when the vehicle makes a turn. In this suspension apparatus, the end portion of a suspension spring at the vehicle body side or the end portion of an upper arm at the vehicle body side are secured to a movable member associated with a steering operation member for movement. In the vehicle equipped with this suspension apparatus, driver can enjoy the similar steering sense or feeling as a motorcycle.

11 Claims, 18 Drawing Figures

BODY BANKING SUSPENSION APPARATUS FOR A VEHICLE

BACKGROUND OF THE INVENTION

This invention relates to a suspension apparatus for a vehicle such as an automobile or a motor tricycle which is equipped with at least one unit of a pair of right and left wheels.

In a vehicle which is equipped with such a pair of right and left wheels, the body tends to decline outwardly or to the other side of the turning center of the vehicle when it turns due to centrifugal force. On the other hand, in a motorcycle, the turn is made while declining its body inwardly. In other words, the motorcycle makes a turn while leading. The present invention intends to decline a body of an automobile or a motor tricyle toward the turning center side while it turns, so that a driver of the automobile or the motor tricycle can enjoy the same sort of driving sense or feeling as that of the motorcycle.

One example of such a motor tricycle which can decline its body toward the turning center side when it turns is disclosed in Japanese Laid-Open Patent Publication (Kokai Tokkyo Koho) No. sho 54-25033. This motor tricycle has a pair of right and left front wheels and one rear wheel. The vehicle is designed as such that when it turns, a driver shifts his weight toward the turning center side resisting the centrifugal force in order to decline the vehicle body toward the turning center side. Since this motor tricycle is of a saddle type just as same as a common motorcycle, the driver can comparatively easily shift his weight to decline the vehicle body as described above. However, in the case of a common automobile where the driver sits on a seat, it is not necessarily an easy job for him to decline the vehicle body by shifting his weight.

SUMMARY OF THE INVENTION

It is therefore an object of the present invention to provide a suspension apparatus for a vehicle, wherein the vehicle body can be automatically declined toward the turning center side by means of steering operation and without the driver intentionally shifting his weight to that direction irrespective of whether the vehicle is of said saddle type or seat type.

Another object of the present invention is to provide a suspension apparatus for a vehicle, wherein wheels of the vehicle can be automatically declined toward the turning center side by the steering operation.

In order to obtain the above objects, in the present invention, one end of a suspension spring at a vehicle body side is secured to a movable member associated with a steering member for movement, so that the vehicle body may decline toward the turning center side according to the steering operation when the vehicle makes a turn.

Also, in the present invention, one end of an upper suspension arm at a vehicle body side is secured to a movable member associated with a steering member for movement, and a suspension spring is stretched between a lower suspension arm and a vehicle body, so that wheels may decline toward the turning center side according to the steering operation when the vehicle makes a turn.

According to the present invention, when the vehicle turns, the driver can enjoy similar steering operation sense or feeling to a motorcycle.

These and other objects and features of the present invention will become apparent to those skilled in the art upon reading the following detailed description with reference to the accompanying drawings in which:

DETAILED DESCRIPTION OF THE EMBODIMENTS

Several embodiments of the present invention will be described hereunder with reference to the accompanying drawings. In these embodiments, the present invention is applied to a motor tricycle having two front wheels and one rear wheel. Like numerals denote like or corresponding parts throughout several sheets of the drawings.

Figure 1:
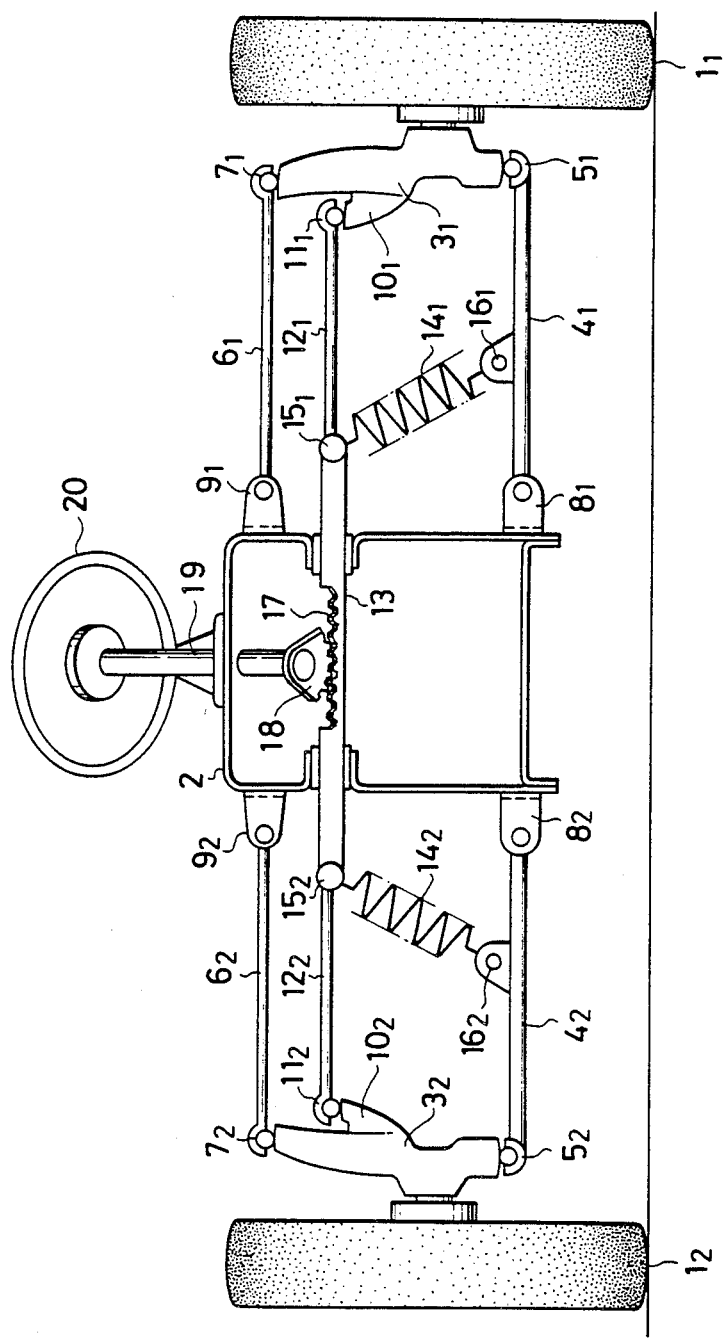
FIG. 1 is a front view showing one embodiment of the present invention at a time when a vehicle is running straight forward.
Figure 2:
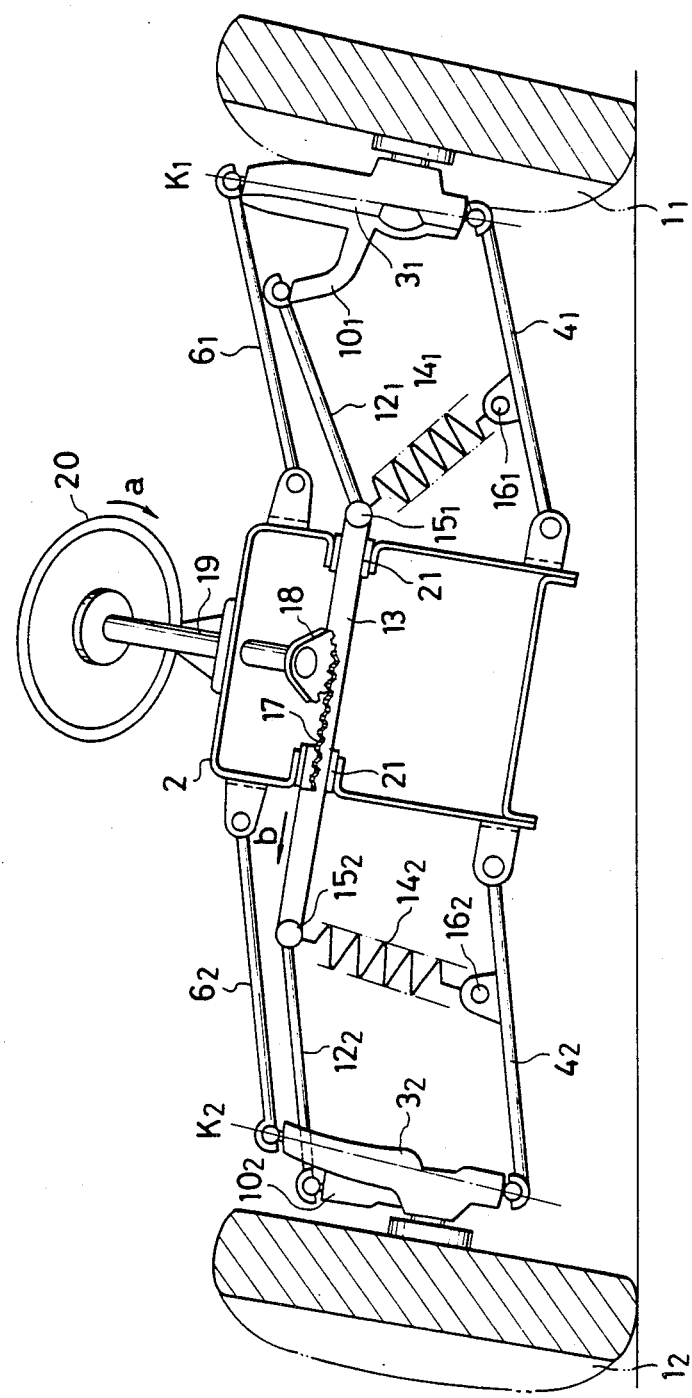
FIG. 2 is a front view of the same embodiment but when turning.

FIG. 1 and FIG. 2 illustrate an embodiment of the present invention, wherein front wheels are suspended with a double wishbone type suspension. More specifically, FIG. 1 is a front view of the suspension apparatus at a time when running straight forward, and FIG. 2 is a front view of the same but showing when turning to the left. $1_1$ denotes a left front wheel, $1_2$ denotes a right front wheel, and 2 denotes a body of a motor tricycle. The expression "right" or "left" as used herein means right or left when viewed from a driver. Said left and right front wheels $1_1$, $1_2$ are integrally provided with knuckles $3_1$, $3_2$ respectively, to the lower ends of which lower arms $4_1$, $4_2$ are connected through ball joints $5_1$, $5_2$ respectively. The upper ends of said kunckles $3_1$, $3_2$ are connected with upper arms $6_1$, $6_2$ through ball joints $7_1$, $7_2$ respectively. The other ends of the lower arms $4_1$, $4_2$ are pivotally connected to the body 2 through brackets $8_1$, $8_2$ and the other ends of the upper arms $6_1$, $6_2$ are pivotally connected to the body 2 through brackets $9_1$, $9_2$. With the foregoing arrangement, the so-called double wishbone type suspension is constituted.

Said knuckles $3_1$, $3_2$ are provided with knuckle arms $10_1$, $10_2$ projecting backward therefrom. The knuckle arms $10_1$, $10_2$ are connected with tie rods $12_1$, $12_2$ through ball joints $11_1$, $11_2$. The other ends of said tie rods $12_1$, $12_2$ are pivotally connected to both ends of slider 13 respectively.

$14_1$, $14_2$ denote suspension springs respectively. The upper ends of these suspension springs are engaged to the both ends of said slider 13 through pivots $15_1$, $15_2$ respectively, while the lower ends of them are engaged to the intermediate portions of said lower arms $4_1$, $4_2$ through pivots $16_1$, $16_2$.

Said slider 13 is provided at the central portion thereof with a rack 17, with which a pinion 18 fixed to a steering shaft 19 is meshed. 20 denotes a steering wheel or a steering operation member, with which said slider 13 is associated for movement thereby constituting a movable member.

When the vehicle runs straight forward, the pinion 18 meshes with the rack 17 at the central position thereof as shown in FIG. 1. However, in other occasions such as, when the vehicle effects a left turn or turns toward the right direction in the figure, the steering wheel 20 is turned towards the clockwise direction as shown by an arrow a in FIG. 2. Then, due to the rotation of said pinion 18, the slider 13 slides toward the right (when viewed from a driver), as shown by an arrow b, guided by a bearing 21. Since the suspension springs $14_1$, $14_2$ are disposed in such a manner as to incline the upper portions thereof toward the body side as shown in FIG. 1, when the slider 13 moves toward the right as mentioned above, compression force is acted on the right side suspension spring $14_2$. As a result, the right side lower arms $4_2$ is pushed down relative to the body 2 by said spring $14_2$. Simultaneously, tension force is acted on the left side suspension spring $14_1$. As a result, the left side lower arm $4_1$ is pulled up relative to the body 2 by said spring $14_1$. At this moment, said upper arms $6_1$, $6_2$ follow the movement of said lower arms $4_1$, $4_2$. However, since the wheels $1_2$, $1_1$ are normally contacted the earth, when the respective members are moved in such a manner as described in the foregoing, the body 2 is finally caused to decline toward the left or to the turning center side (the front wheels $1_1$, $1_2$ are also caused to decline) as shown in FIG. 2. Thus, the vehicle turns in a lean state as in the case with the motorcycle.

Although the left turn is described in detail in the above, the right turn is also effected in the same manner.

In connection with the above description, it should be noted that since the both ends of said slider 13 are connected to said knuckle arms $10_1$, $10_2$ through said tie rods $12_1$, $12_2$ respectively, the respective knuckles $3_1$, $3_2$ rotate about king pin axes $K_1$, $K_2$, and as soon as the body 2 starts declining as mentioned above, the respective front wheels $1_1$, $1_1$ are steered.

In the embodiment as shown in FIG. 1 and FIG. 2, the suspension springs 14 are disposed between the slider 13 and the lower arms 4. Alternatively, said suspension spring may be interposed between the slider 13 and the upper arms 6. On this case, the suspension springs may be arranged in such a manner as, for example, that when the slider 13 slides toward the right, the right upper arm $6_2$ is pulled down and the left upper arm $6_1$ is pushed up.

Figure 3:
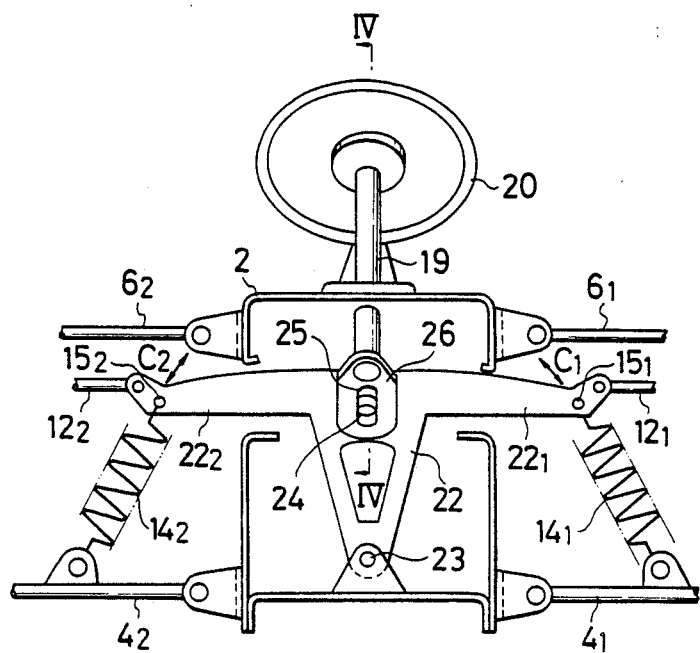
FIG. 3 is a partial front view showing a modified embodiment of the above.
Figure 4:
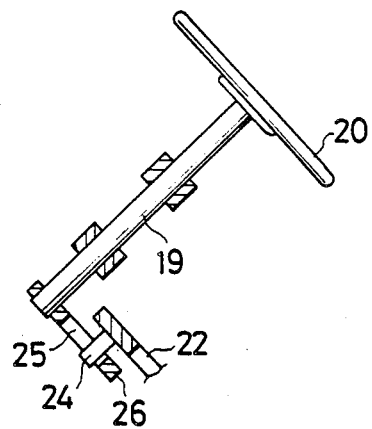
FIG. 4 is a section taken on line IV—IV of FIG. 3.

FIG. 3 and FIG. 4 illustrate a modified embodiment of the above. In this modified embodiment, an oscillating arm 22 is employed in the place of said slider 13. This oscillating arm 22 is oscillatably and pivotably connected to the vehicle body by means of a pivot 23. Said oscillating arm 22 is provided at the upper portion thereof with arms $22_1$, $22_2$ extending leftward and rightward. These arms $22_1$, $22_2$ are pivotally connected at the both ends thereof with pivots $15_1$, $15_2$ adapted to mount the suspension springs $14_1$, $14_2$ respectively. Said oscillating arm 22 is planted at the central line thereof with a pin 24, to which a lever 26 is engaged through an elongated slot 25.

Said lever 26 is fixed to the steering shaft 19 and rotates together with the latter to oscillate the oscillating arm 22 rightward and leftward. In this modified embodiment, since the moving direction of the pivots $15_1$, $15_2$ is substantially in accord with the axial direction of the suspension springs $14_1$, $14_2$ as shown by arrows $C_1$, $C_2$, the pulling up force or pushing down force can be more effectively transmitted to the lower arms $4_1$, $4_2$. Also, the ratio of the angle of rotation of said oscillating arm 22 with respect to the angle of rotation of said lever 26 becomes smaller as the angle of rotation of the lever 26 increases.

In the examples shown in FIG. 1 through FIG. 4, the present invention is applied to the double wishbone type suspension. However, the present invention may be applied to other types of suspensions without doubt.

Figure 5:
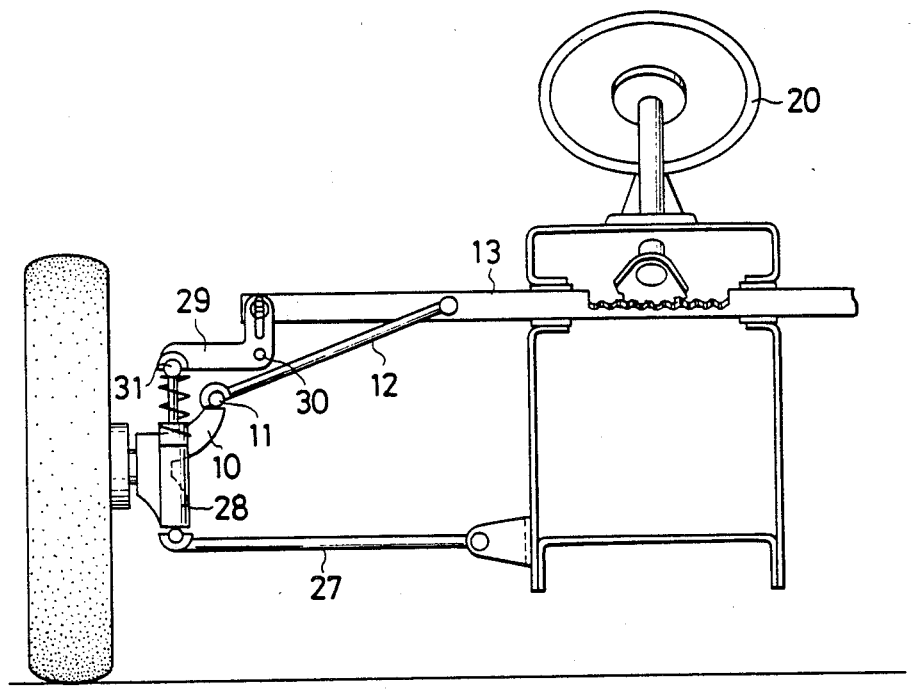
FIG. 5 is a partial front view showing another modified embodiment.

FIG. 5 illustrates an example wherein the present invention is applied to a McPherson type suspension. 27 denotes a control arm, and 28 denotes a McPherson strut. 29 denotes a bell crank pivotally mounted to the body 2 through a pivotal shaft 30. One arm of this bell crank 29 is mounted on an upper mount 31 of said McPherson strut 28, and the other arm of said bell crank 29 is pivotally secured to the foremost end portion of a slider 13 similar to the one as shown in FIG. 1 and FIG. 2. One end of a tie rod 12 is pivotally secured to an intermediate portion of said slider 13. The other end thereof is connected to a knuckle arm 10. In this embodiment, according to the movement of the slider 13, the compression force or the tension force acts on the McPherson strut 28 through the bell crank 29, said McPherson strut 28 corresponding to the suspension springs 14 shown in FIG. 1 through FIG. 4. As a result, the control arm 27 is pushed down or pulled up, thus enabling to obtain quite the same functions and effects as those of the embodiment in FIG. 1 through FIG. 4.

Figure 6:
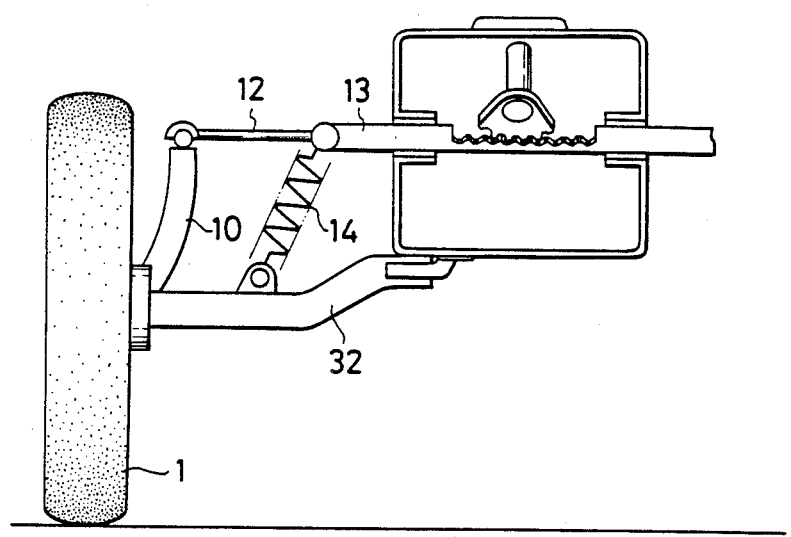
FIG. 6 is a partial front view showing a further modified embodiment.
Figure 7:
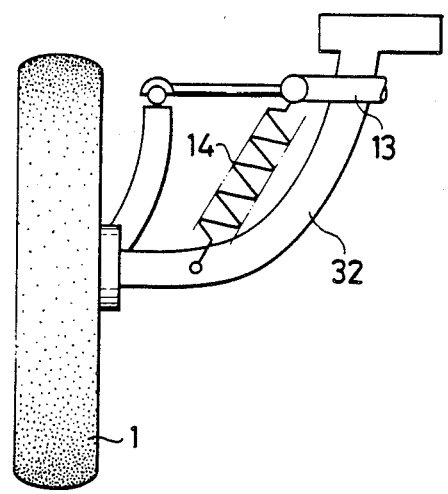
FIG. 7 is a plan view thereof.

FIG. 6 and FIG. 7 illustrate an example wherein the present invention is applied to a leading arm type suspension. A suspension spring 14 is stretched between and secured to a leading arm 32 and a slider 13.

Needless to say, the present invention may be applied to a trailing arm type suspension in the same manner as described.

Figure 8:
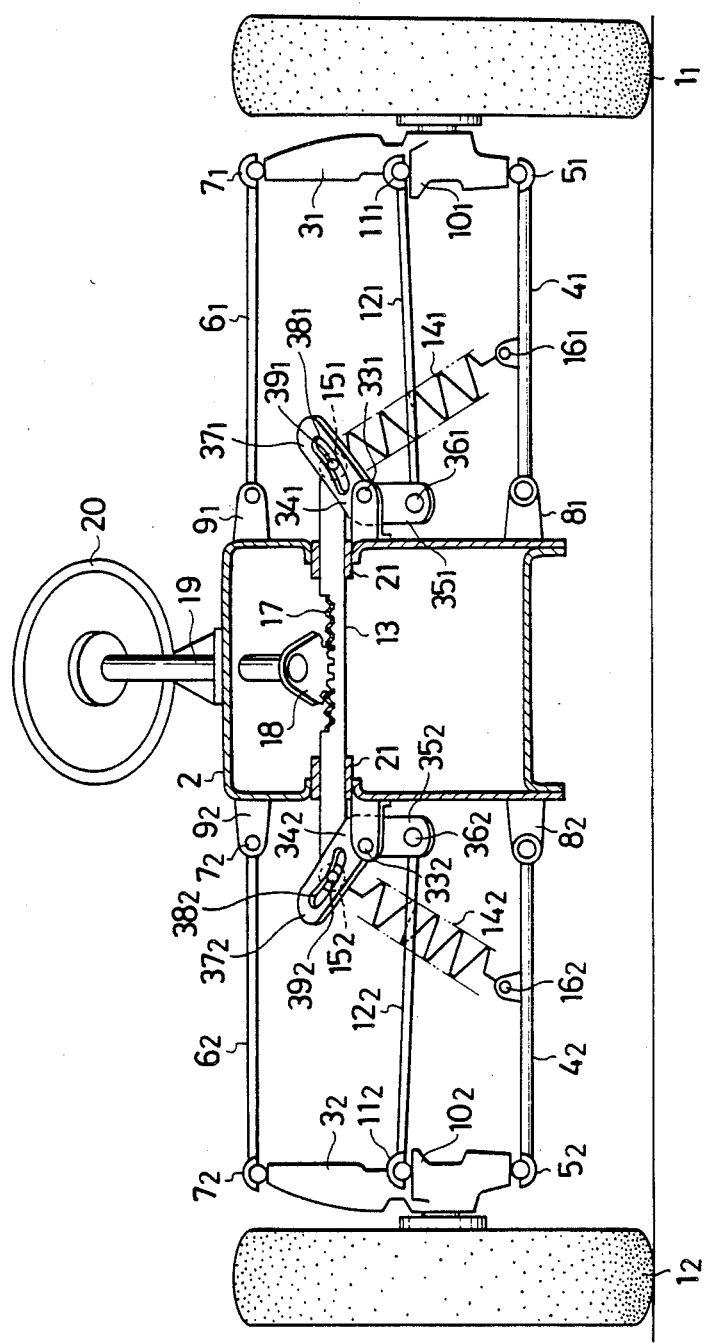
FIG. 8 is a front view showing another embodiment of the present invention when the vehicle is running straight forward.
Figure 9:
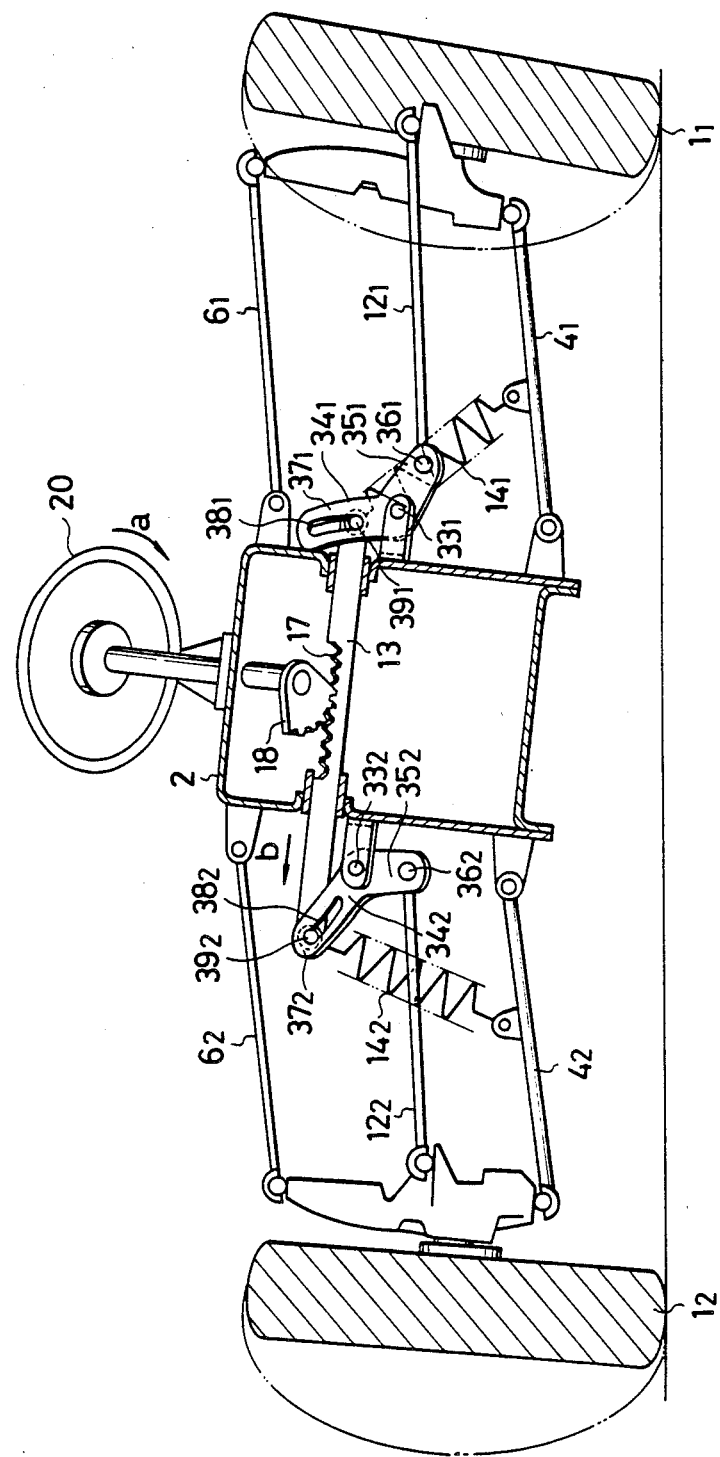
FIG. 9 is likewise a front view of the above but showing when turning.
Figure 10:
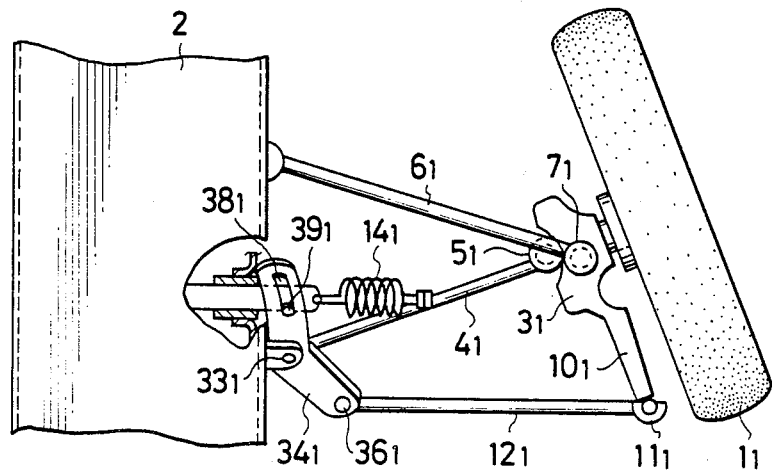
FIG. 10 is a partial plan view of FIG. 9.

FIG. 8 through FIG. 10 illustrate another embodiment of the present invention. In this embodiment, lever members 34 pivotally connected to a body 2 through pivots 33 are provided. One end portion of a tie rod 12 is pivotally connected to one arm piece 35 of said lever member 34. A knuckle arm 10 is projected forward contrary to the first embodiment. The other arm piece 37 of said lever member 34 is formed with a groove 38 in which a pin 39 projecting from said slider 13 is engaged. Accordingly, the slider 13 is connected to said arm piece 37. Accordingly, the connecting point between the slider 13 and the arm piece 37 which is determined by the position of the pin 39 on the arm piece 32 is movable on the arm piece 37 along said groove 38. When the slider 13 is moved right and left by operating a steering wheel 20, the pin 39 and the groove 38 are slided relative to each other. In response to said sliding movement, said lever member 34 pivots about the pivot 33. At this moment, the ratio of the angle of rotation of the lever member 34 caused by the moving amount of the pin 39 with respect to the angle of operation of the steering wheel 20 is determined according to the configuration of the groove 38. Consequently, for example, if the configuration of the groove 38 is formed as such that when the angle of operation of the steering wheel 20 is 0 or small, the ratio of the angle of rotation of the lever member 34 with respect to the angle of rotation of said wheel 20 is small, and said ratio becomes larger as the angle of operation of the wheel 20 becomes larger, the so-called progressive non-linear type steering performance can be obtained. Also, by suitably selecting the configuration of the groove 38, it is possible to obtain a linear type steering performance in which said ratio is always constant or otherwise a non-linear type steering performance where said ratio becomes smaller as the angle of operation of the steering wheel 20 becomes larger. The configuration of the groove 38 can be determined geometrically with ease according to the positional relation between the pivots 33, 36 and the pin 39.

Figure 11:
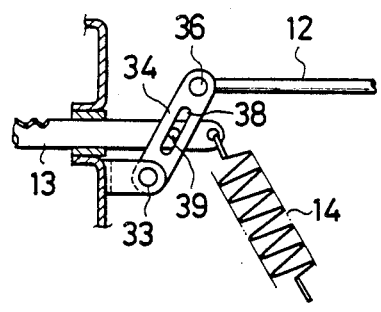
FIG. 11 and FIG. 12 are front views showing modified embodiments of a lever, respectively.
Figure 12:
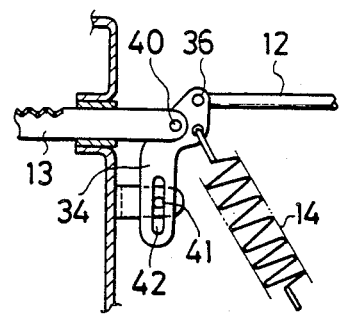

FIG. 11 and FIG. 12 illustrate modifications of said lever member 34 respectively. In FIG. 11, a tie rod connecting point (pivot 36) and a slider connecting point (pin 39) are provided at the same side with respect to a body connecting point (pivot 33) of a lever member 34. In FIG. 12, a slider 13 is pivotally secured to the lever member 34 and the body connecting point is designed to be movable by means of a groove 42 and a pin 41 engaged therein for movement. In these modifications, the configurations of the grooves 38 and 42 can be determined in the same manner as described before.

Figure 13:
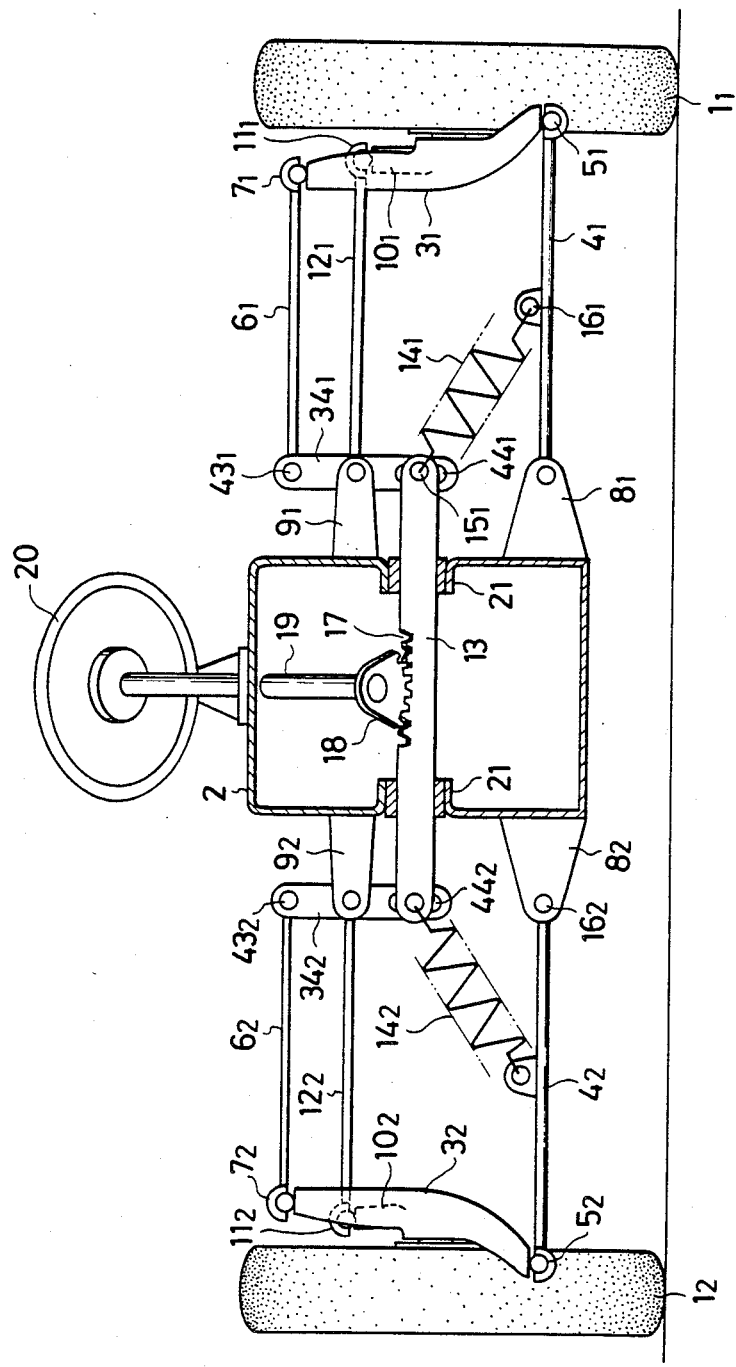
FIG. 13 is a front view showing a further embodiment of the present invention when the vehicle is running straight forward.
Figure 14:
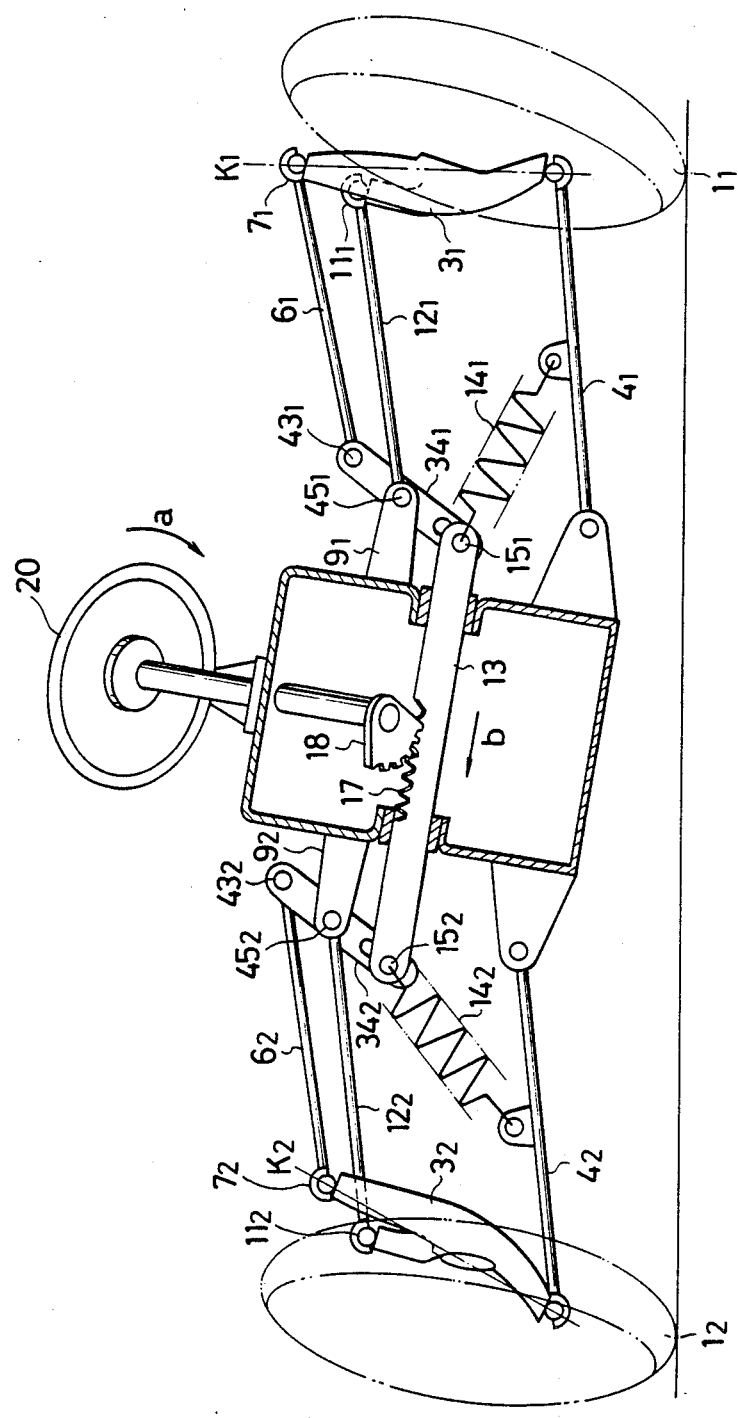
FIG. 14 is likewise a front view of the above but showing when turning.
Figure 15:
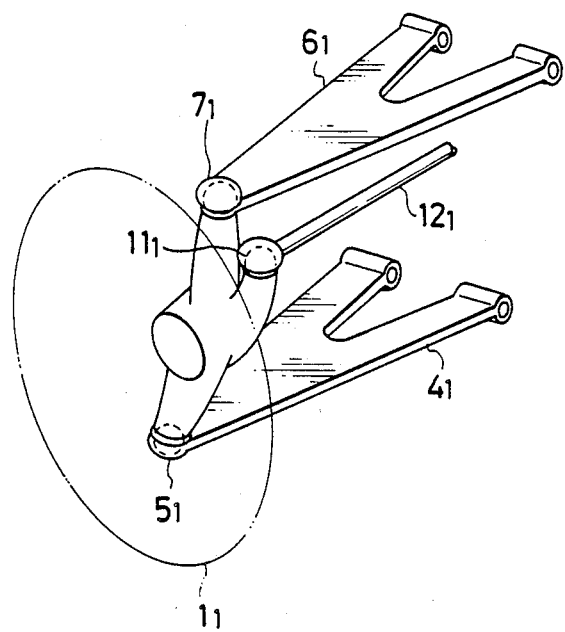
FIG. 15 is a perspective view of a left front wheel of the above embodiment when viewed from backward.

In another embodiment as shown in FIG. 13 through FIG. 15, a tie rod 12 connected at one end thereof to a knuckle arm projecting backward is pivotally secured at the other end to a body 2 through a bracket 9. Said bracket 9 is also pivotally connected with an intermediate portion of a lever member 34. An upper arm 6 is pivotally connected at the inner end portion thereof to the upper arm portion of said lever member 34, and the connecting point 43 thereof serves as a body mounting portion of the upper arm 6. The arm portion at the lower part of said lever member 34 is formed with an elongated slot 44. By engaging the pin projecting from the end portion of the slider 13 in said elongated slot 44, the slider 13 is connected to the lever member 34.

When this vehicle is about to turn, for example, leftward from the straight running state as shown in FIG. 13, the steering wheel is, as shown by an arrow a in FIG. 14, caused to turn clockwise in the figure. Then, due to the rotation of a pinion 18, the slider 13 is moved rightward as shown by an arrow b. According to the movement of said slider 13, the lever member 34 is pivoted about its pivotal shaft 45 in the clockwise direction in the figure. Accordingly, an upper arm $6_1$ at the left side is caused to push a ball joint $7_1$ outward, and an upper arm $6_2$ at the right side is caused to pull the ball joint $7_2$ inward. As a result, wheels $1_1$, $1_2$ are declined leftward with respect to a body 2, that is, toward the turning center side. While, since the inner edges of tie rods $12_1$, $12_2$ are mounted in the positions of said pivotal shafts 45, the positions of ball joints $11_1$, $11_1$ are irrespective of the rotation of the lever members $34_1$, $34_2$. Accordingly, knuckles $3_1$, $3_2$ are pivoted about king pin axes $K_1$, $K_2$, and the front wheels $1_1$, $1_2$ are caused to decline, as already described, toward the turning center side and simultaneously steered in the turning direction.

On the other hand, the slider 13 is provided at the both ends thereof with the upper end portions of suspension springs $14_1$, $14_2$. Since the suspension springs $14_1$, $14_2$ are mounted in such a manner as to decline the upper portions thereof toward the body side of the vehicle, as shown in FIG. 13, when the slider 13 is moved rightward as mentioned above, the compression force is acted on the suspension spring $14_2$ at the right side. Accordingly, said spring $14_2$ pushes a lower arm $4_2$ at the right side downward relative to the body 2. Simultaneously, the tension force is acted on the suspension spring $14_1$. Accordingly, said spring $14_1$ pulls a lower arm $14_1$ at the left side upward relative to the body 2. At this moment, the upper arms $6_1$, $6_2$ follow the movement of these lower arms $4_1$, $4_2$, while causing to decline the wheels $1_1$, $1_2$. However, since the wheels $1_1$, $1_2$ are normally contacted the earth, when the respective members are moved as mentioned above, the body 2 is finally declined, as shown in FIG. 14, leftward, that is, toward the turning center side. In accordance with this movement, the front wheels $1_1$, $1_2$ are further declined.

In this way, the motor tricycle according to the embodiment as shown in FIG. 13 through FIG. 15 declines its body 2 leftward when it makes a left turn and turns in a lean state as in the case with the motorcycle. At this moment, although the front wheel 1 is caused to decline toward the same side as the body 2 while being steered in the turning direction, the declining angle of the front wheel 1 becomes larger than the declining angle of the body 2. Thus, a satisfactory turning performance can be obtained. The rear wheel is declined according to the declining of the vehicle body. Although the left turning is described in the foregoing, the same is applicable to the right turning as well.

Figure 16:
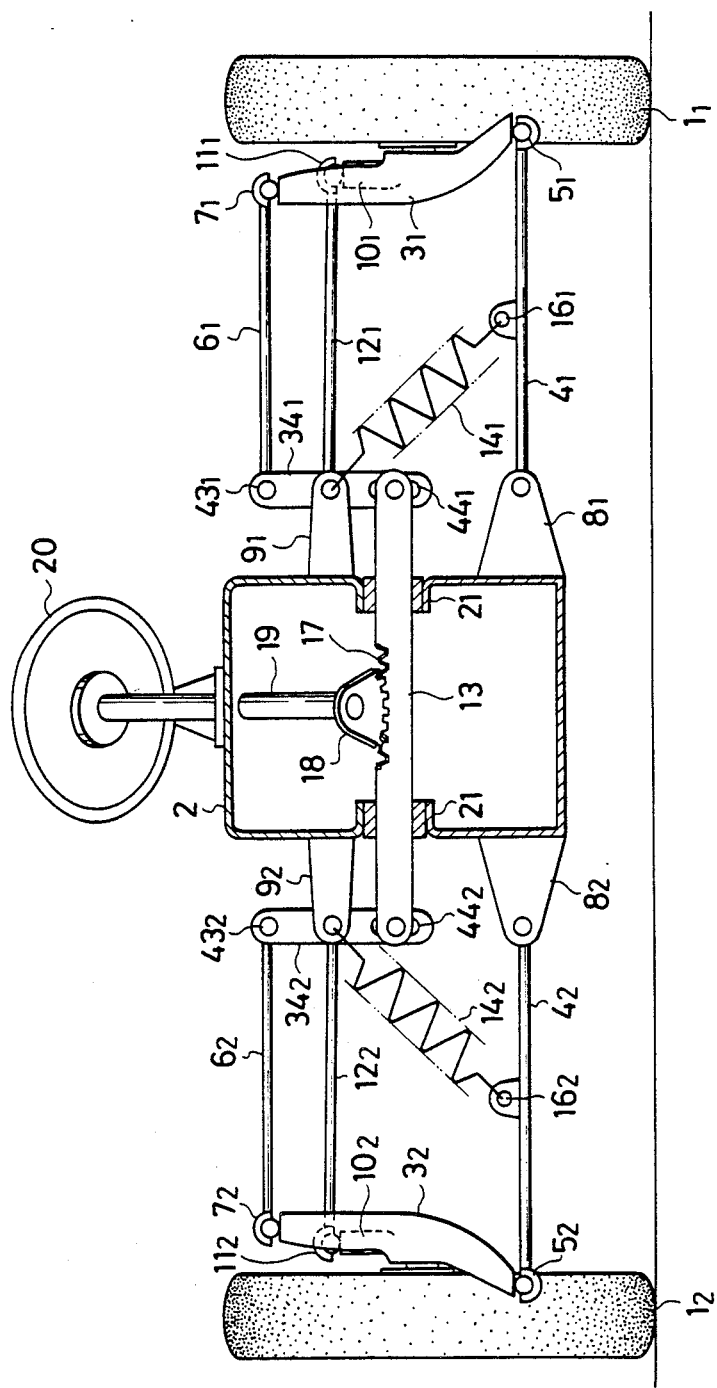
FIG. 16 is a front view showing a still further embodiment of the present invention when the vehicle is running straight forward.
Figure 17:
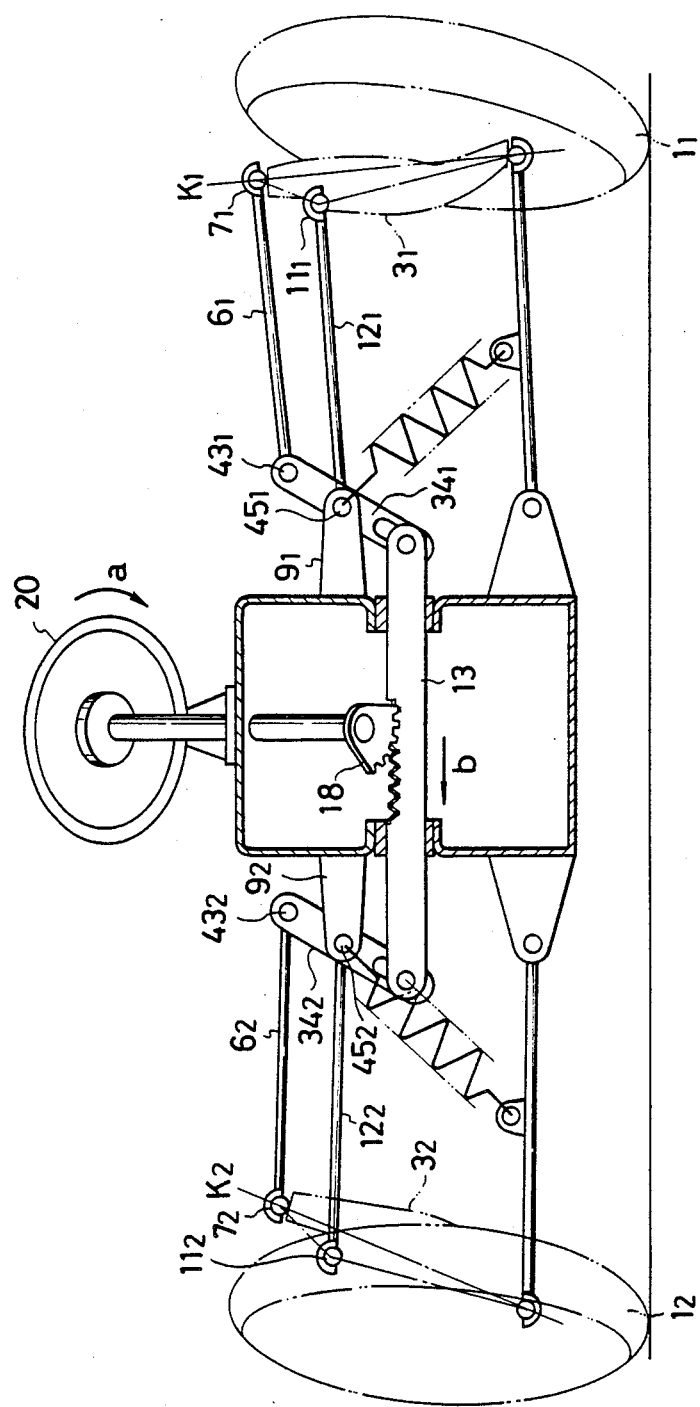
FIG. 17 is likewise a front view of the above but showing when turning.

Another embodiment shown in FIG. 16 and FIG. 17 is different from the embodiment shown in FIG. 13 and FIG. 14 in a point that one end portion of the suspension spring 14 at the body side is secured to a bracket 9. Also in this embodiment, when the vehicle makes a turn, a wheel 1 is steered in the turning direction and simultaneously declined toward the turning center side relative to a body 2. However, since the suspension spring 14 is secured to the bracket 9, the body 2 and a lower arm 4, the body 2 does not decline when it makes a turn.

In this embodiment, a motorcycle-like steering sense similar to that as described with respect to the above respective embodiments can be enjoyed as well.

Figure 18:
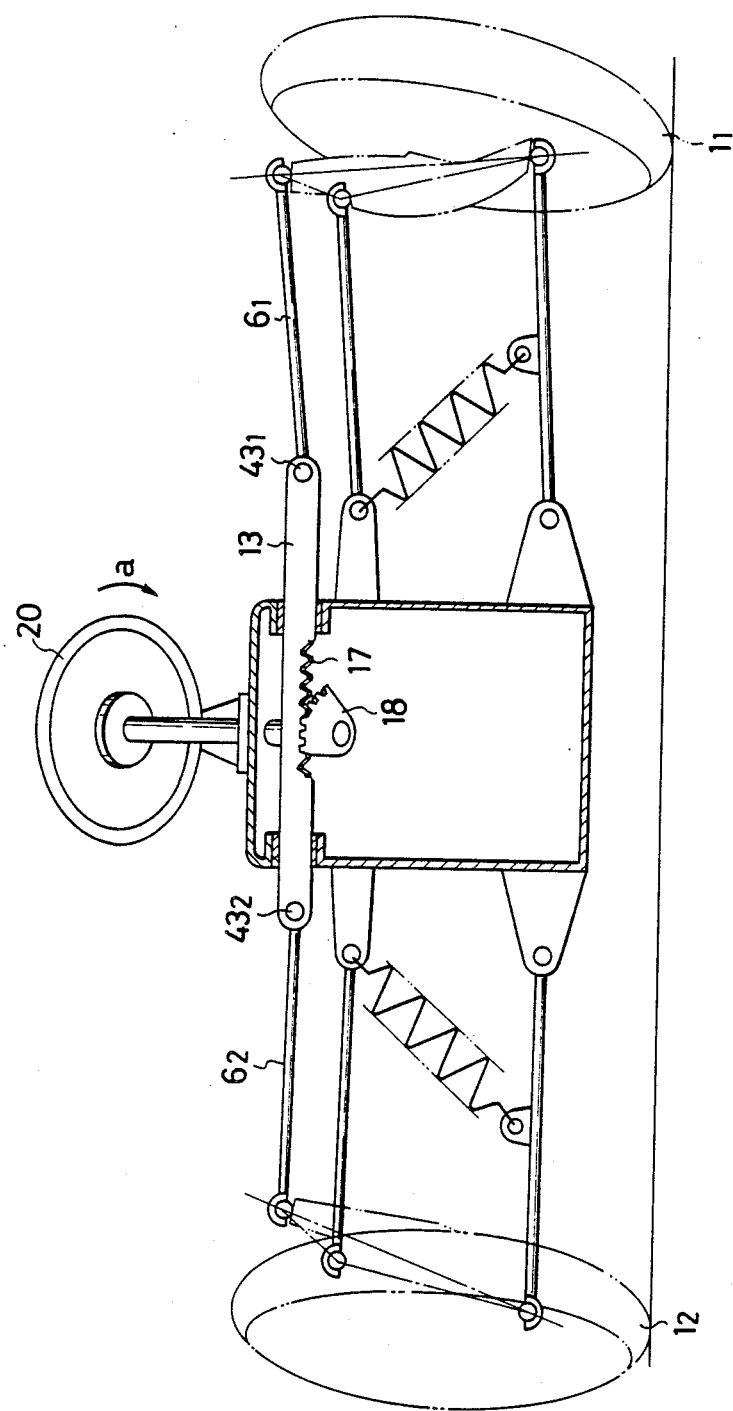
FIG. 18 is a front view similar to FIG. 17 showing a modified embodiment of the above.

In a modification as shown in FIG. 18, the inner end portion of an upper arm 6 is directly secured to one end portion of a slider 13 without a lever member disposed therebetween, and a pinion 18 meshes with a rack 17 from downward. Accordingly, when a left turning operation is made by turning a steering wheel 20 in the direction as shown by an arrow a in the same manner as described with respect to FIG. 17, the slider 13 is caused to slide leftward, and a front wheel 1 acts in the same manner as FIG. 17.

While several preferred embodiments of the present invention have been described in the foregoing, it is to be understood that the present invention is not limited to these embodiments. Instead, several modifications may of course be made within the scope of the invention. For example, instead of a steering wheel as shown in the figures, a bar handle may be employed as a steering member. Also, instead of a steering mechanism using a pinion and a rack, other mechanisms such as a hydraulic control type may be employed. Furthermore, the present invention may of course be applicable to other vehicles, e.g., automobiles, than motor tricycles.

What is claimed is:

1. A suspension apparatus for a vehicle provided between a pair of right and left wheels of the vehicle and the vehicle body characterized in that one end portion of a suspension spring at a vehicle body side is secured to a movable member associated with a steering operation member for movement, the other end portion of the suspension spring is connected to a suspension arm, a lever member pivotally connected to the vehicle body is connected to said movable member, and a tie rod is connected to said lever member, so that when the vehicle makes a turn, the vehicle body is caused to decline toward the turning center side according to the steering operation.

2. A suspension apparatus as claimed in claim 1, wherein a connecting point between said lever member and said movable member is movable along a predetermined slot in said lever member.

3. A suspension apparatus as claimed in claim 1, wherein a connecting point between said lever member and said vehicle body is movable along a predetermined slot in said lever member.

4. A suspension apparatus as claimed in claim 1, wherein said suspension spring is connected at its other end to a lower suspension arm, said movable member is connected to one arm portion of said lever member, an upper suspension arm is connected to the other arm portion of said lever member, and a tie rod is connected to a portion of said lever member pivotally connected to the vehicle body.

5. A suspension apparatus for a vehicle provided between a pair of right and left wheels of the vehicle and the vehicle body, the vehicle further including a steering operation member and a movable member associated with the steering operation member for movement laterally of the vehicle body upon turning of the steering operation member, said apparatus comprising on each side of said vehicle body:

a lower suspension arm pivotally connected to the vehicle body and the respective wheel,
a suspension spring connected between the movable member and said lower suspension arm,
a lever member pivotally connected to the vehicle body and connected to the movable member, and
a tie rod connected to a portion of said lever member and the respective wheel;
whereby when the vehicle makes a turn, the vehicle body is caused to decline toward a turning center side according to the steering operation.

6. A suspension apparatus as claimed in claim 5, wherein said lever member has a slot in one portion thereof and said movable member includes a pin engaged in said slot and movable therealong.

7. A suspension apparatus as claimed in claim 6, wherein said lever member has a mid-portion and two arm positions, said slot being in one arm portion and said tie rod being pivotally connected to the other arm portion.

8. A suspension apparatus as claimed in claim 10, wherein said lever member has a mid-portion and two arm portions, said lower member being pivotally connected to the body member at one arm portion, said slot being in said mid-portion, and said tie rod being pivotally connected to the other arm portion.

9. A suspension apparatus as claimed in claim 5, wherein said lever member has a slot in one end portion thereof and the vehicle body includes a pin engaged in said slot and movable therealong.

10. A suspension apparatus as claimed in claim 5 wherein said lever member includes a mid-portion and two arm portions, said lever member being pivotally connected to the vehicle body at said mid-portion, said tie rod being connected to said lever member at said mid-portion, and said movable member is connected to one of said arm portions of said lever member; said apparatus further comprising at each side of the vehicle body:

an upper suspension arm connected to the respective wheel and to the other of said arm portions of the respective lever member.

11. A suspension apparatus as claimed in claim 10 wherein said one arm portion of said lever member has a slot therein and said movable member includes a pin engaged in said slot and movable therealong.

* * * * *